United States Patent [19]

Fukuyama

[11] Patent Number: 5,358,592
[45] Date of Patent: Oct. 25, 1994

[54] BAG MAKING MACHINE CONTROL

[75] Inventor: Yoshiaki Fukuyama, Kawagoe, Japan

[73] Assignee: Nippon Flute Co., Ltd., Saitama, Japan

[21] Appl. No.: 978,171

[22] Filed: Nov. 17, 1992

Related U.S. Application Data

[63] Continuation of Ser. No. 377,581, Jul. 11, 1989, abandoned.

[51] Int. Cl.$^5$ ............................................. B31B 1/14
[52] U.S. Cl. .................... 156/361; 156/515; 226/49
[58] Field of Search ............... 156/515, 361; 83/171, 83/209, 210, 241; 226/32, 49, 136, 245

[56] References Cited

U.S. PATENT DOCUMENTS

| | | | |
|---|---|---|---|
| 3,902,954 | 9/1975 | Lotto | 156/510 |
| 3,948,425 | 4/1976 | Bala | 226/136 X |
| 4,077,306 | 3/1978 | Wech | 156/515 X |
| 4,101,363 | 7/1978 | Lotto | 156/250 |
| 4,115,182 | 9/1978 | Wildmoser | 156/583.2 X |
| 4,193,329 | 3/1980 | Strunc | 83/235 X |
| 4,396,449 | 8/1983 | Tumminia | 156/251 |
| 4,737,904 | 4/1988 | Ominata | 83/209 X |
| 4,796,499 | 1/1989 | Achelpohl | 83/171 X |

*Primary Examiner*—David A. Simmons
*Assistant Examiner*—James J. Engel, Jr.
*Attorney, Agent, or Firm*—Bradford E. Kile; Ruffin B. Cordell; Michael J. McKeon

[57] ABSTRACT

A bag making machine for producing thermoplastic resin film bags including rollers for intermittently advancing a flat tubular web of thermoplastic resin film, a sealing assembly positioned downstream from the roller, a heated cutting bar having a sharp edge for providing efficient cutting and concomitantly preventing build-up of carbon by-product, roller elements for reversing the direction of advancement of the resin film, first drive elements for controllably driving the rollers in first and second directions and second drive elements for transversely driving the sealing and heated cutting bar toward and away from the flat web of thermoplastic resin film.

9 Claims, 3 Drawing Sheets

BAG MAKING MACHINE CONTROL

This application is a continuation of application Ser. No. 07/377,581, filed Jul. 11, 1989, now abandoned.

BACKGROUND OF THE INVENTION

This invention relates to a novel bag making machine. More specifically, this invention relates to a machine for making bags of thermoplastic resin film and a control system which eliminates undesirable effects caused by interrupting the bag making procedure.

Thermoplastic resin bags, such as those used in supermarkets, are produced from a long, flat, tubular web of thermoplastic synthetic resin film. The tubular web is intermittently fed into a bag making machine where heat is transversely applied to the web in order to form a seal between the two sides of the web. A cutting edge intersects and transversely severs the web adjacent the seal in order to complete formation of a bag.

A common configuration for achieving the above mentioned sequence of operations includes seal or platen rollers which intermittently draw a web of thermoplastic film into the bag making machine. Upon cessation of advancement of the web, a hot press mechanism, including a heated fixed seal bar and a heated movable reciprocating seal bar, engages and melts the top and bottom web layers together. Upon cooling of the thermoplastic web, a seal is formed. The sealing bars are coated with an anti-adhesive material, such as Teflon, in order to prevent the weld bead of the thermoplastic web from adhering to the seal bars. Associated with the upper reciprocating seal bar is a cutting edge which transversely severs the thermoplastic web adjacent to the seal. The drive rollers then advance the web the length of a bag in order to repeat the sealing and severing cycle. In the past this process has been rapidly repeated at a rate of approximately 100 to 120 cycles per minute.

Interruption of the bag making procedure necessary for reasons including removal of plastic which adheres to the cutting edge, replacement of the thermoplastic resin web, change over operations, etc. Because heat radiates from the heated seal bars, the web must be positioned away from the seal bars during interruption of the bag making procedure so that the thermoplastic film does not undesirably melt and adhere to the seal bars.

As a countermeasure to the above problem, the intermittent feeder has conventionally been provided with another driving source such as an air cylinder in addition to a motor in order to move the web away from the seal bars and cutting edge. When the bag machine operation is stopped, the web is isolated from the seal bars and cutting edge by retracting the web in the backward direction by means of the air cylinder. When the machine operation is resumed, the web is returned to the original position by the air cylinder.

Problems with the above described machine configuration have been encountered, at least in part, due to the physical nature and inertial effects of pulleys and brake and clutch mechanisms, which do not insure precise timing. Timing is an extremely important component of a bag making machine because correlation of various machine operations is imperative to obtain desired results. When it is desirable to increase the rate of production up to, for example, 150 to 160 cycles per minute, problems of inertia and timing are exponentially exacerbated.

More recently the quality of the severing action was improved by heating the cutting edge. This allowed for quicker severing of the thermoplastic web because both heat and the physical action of the cutting edge were employed to sever the web. However, adherence of the thermoplastic web to the cutting edge presented a problem. This further concern was addressed by the conception of a seal bar mechanism in which the cutting edge was heated to a degree higher than that of the adjacent heated seal bar in order to allow combustion removal of any carbon by-product of the thermoplastic web, thereby encouraging self-actuated cleansing of the cutting edge and uninterrupted operation of a bag making machine. However, an elevated temperature of the cutting edge with respect to the seal bar adversely affects the Teflon coating on the seal bar. The integrity of the seal itself may also be affected because radiant heat emanating from the cutting edge tends to melt adjacent thermoplastic web.

Problems associated with radiant heat transfer from a superheated cutting edge were addressed by positioning the cutting edge away from the seal bar during periods of cycle repose. More specifically, the cutting edge was vertically recessed from the seal bars in order to allow air circulation between the two members. However, in order that the sealing and cutting operations occur substantially concurrently, and thereby encourage efficient machine operation, the cutting edge must advance and withdraw from the thermoplastic web at a rate greater that that of the movable heated seal bar. During any instance of interruption of the bag making procedure, an increased rate of withdrawal or retraction of the end of a bag is necessary in order to preserve the integrity of the end of the bag adjacent to the super heated cutting edge.

Advancement of the cutting edge and rapid retraction of the thermoplastic web during cycle interrupt has been difficult to achieve due to constraints associated with the air cylinder and other mechanisms employed in present bag making machines. These limitations inhibit the benefits associated with a self-cleansing heated cutting edge and a rapid bag making cycle.

The difficulties suggested in the preceeding are not intended to be exhaustive but rather are among many which may tend to reduce the effectiveness and product quality associated with present bag making machines. Other noteworthy problems may also exist; however, those presented above should be sufficient to demonstrate that thermoplastic bag making machines appearing in the past will admit to worthwhile improvement.

OBJECTS AND BRIEF SUMMARY OF THE INVENTION

Objects

It is therefore a general object of the invention to provide a novel thermoplastic bag making machine which will obviate or minimize difficulties of the type previously described.

It is a specific object of the invention to provide a bag making machine which will minimize undesirable effects caused by discontinuation of a bag making operation.

It is another object of the invention to provide a bag making machine which will allow for fast retraction of a thermoplastic resin web during interruption of the bag making procedure, in order to maintain the integrity of the end of the web.

It is still another object of the invention to provide a bag making machine which will minimize timing errors associated with different operations of a bag making machine, thus increasing machine efficiency and reliability even at increased rates of bag production.

BRIEF SUMMARY OF A PREFERRED EMBODIMENT OF THE INVENTION

A preferred embodiment of the invention which is intended to accomplish at least some of the foregoing objects includes two vertically aligned draw rollers, the lower draw roller being operable to be driven by a servo motor in opposing directions. A thermoplastic tubular web lies between the draw rollers and is advanced to a hot press mechanism which seals the two layers of the tubular web together. The hot press mechanism includes a heated lower fixed sealing bar positioned vertically below a movable and heated upper sealing bar, the combination operably engaging and transversely melting the thermoplastic web. Adjacent to the upper heated sealing bar is a heated cutting edge which vertically reciprocates with the upper heated sealing bar and transversely severs the thermoplastic web in order to complete formation of a bag.

Control for the bag making machine includes an encoder connected to the servo motor which drives the draw rollers. The encoder senses the position of the draw rollers via the servo motor. A servo driver, attached to the encoder, controls operation of the servo motor, which in turn controls the direction of rotation of the draw rollers, as well as the advancement and retraction of a thermoplastic web.

A digital pack equipped with a digital switch and a digital dimension setting apparatus feed information back into the servo driver. A sequencer, controlled by the digital pack correlates motion of the draw rollers, via the digital pack, and an additional servo motor which drives the hot press mechanism. The sequencer controls the start signal, stop signal, cycle start positional signal, cycle end position signal, etc., of the bag making machine.

When interruption of a bag making cycle is required, the draw rollers quickly stop advancing the thermoplastic web, the movable heated upper seal bar and cutting edge withdraw from the fixed lower seal bar, and the draw rollers then quickly reverse direction to retract the thermoplastic web and thereby prevent damage by the hot press mechanism and heated cutting edge.

THE DRAWINGS

Other objects and advantages of the present invention will become apparent from the following detailed description of a preferred embodiment thereof taken in conjunction with the accompanying drawings, wherein:

FIG. 1 is a schematic illustration of the subject invention and depicts the draw rollers, hot press mechanism, and control method of a bag making machine in accordance with a preferred embodiment of the invention;

FIGS. 2A-C is a sequence of side views of the draw rollers and hot press mechanism and depicts the direction of rotation of the draw rollers during normal operation and interruption of the bag making machine, as well as the associated position of a web of thermoplastic resin film;

FIG. 3 illustrates the electrical signals associated with the operation and the timed response of various components of the bag making machine during normal operation and cycle interrupt.

DETAILED DESCRIPTION

Figure 1:
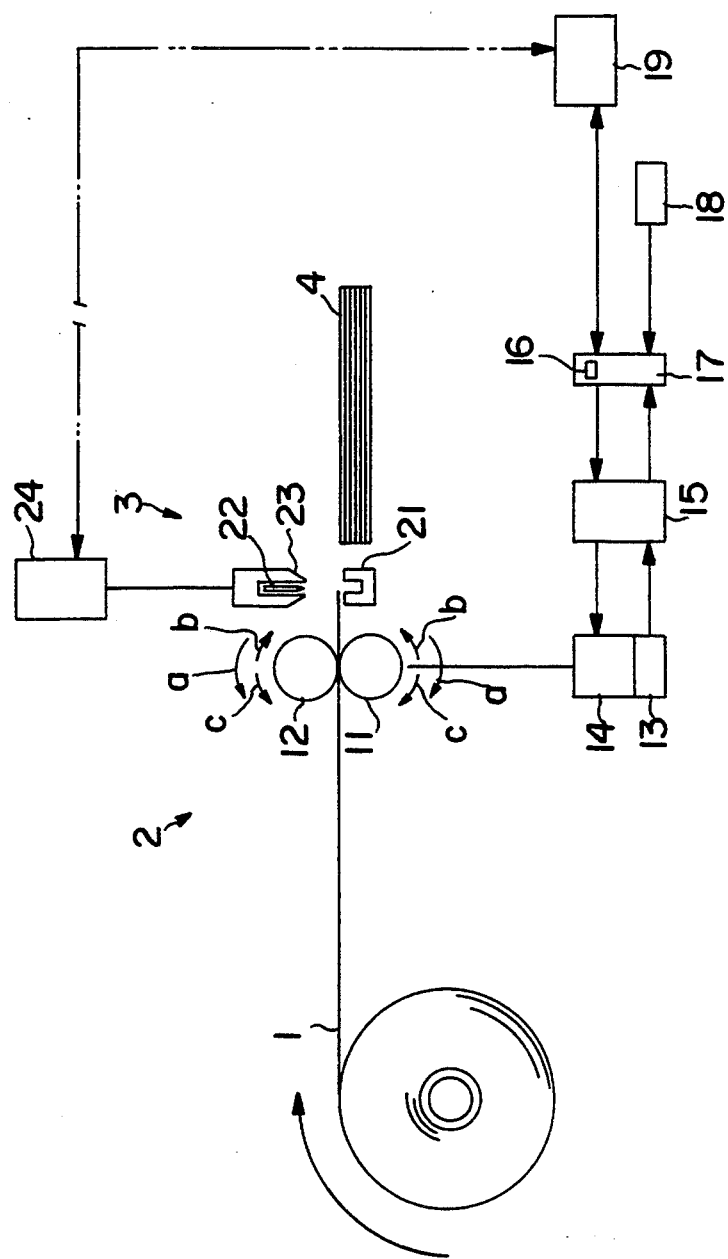

Referring now to the drawings, wherein like numerals indicate like parts, and initially to FIG. 1, there will be seen a schematic view of the subject invention. More particularly, a tubular web of thermoplastic resin film 1 is shown engaged between an intermittent feeder 2 and approaching a seal and sever bag making station 3. Completed bags 4, with a predetermined length, are formed from the thermoplastic web 1 by means of the seal and sever device 3 and are shown in a bundled posture ready for packaging into shipping cartons.

The intermittent feeder 2 is driven by a servo motor 14 and intermittently advances the thermoplastic web 1 into the bag making station 3. The intermittent feeder 2 is comprised of a drive roller 11 and a nip roller 12 which hold the thermoplastic web 1 for controlled movement. A servo motor 14 drives the intermittent feeder 2 and is equipped with an encoder 13, a servo driver 15, a digital pack 17 equipped with a digital switch 16, and a digital dimension setting apparatus 18. The intermittent feeder 2 is controlled by a sequencer 19.

The bag making station 3 includes a heated lower seal bar 21 located in front of the drive roller 11, a heated upper seal bar 23 positioned above the heated lower seal bar 21, and a cutting edge 22. The sealing and severing of the thermoplastic web 1 are controlled by the sequencer 19 which controls a second servo motor 24. Upon interruption of advancement of the thermoplastic web 1 by the intermittent feeder 2, the upper seal bar 23 descends toward the lower seal bar 21 and contacts the thermoplastic web 1, transversely melting the tubular thermoplastic web 1 between the seal bars. Upon cooling of a weld bead of the melted thermoplastic web 1, a seal is formed. When the upper seal bar 23 descends and ascends, the cutting edge 22 moves accordingly and severs the thermoplastic web 1. The intermittent feeder 2 then advances the thermoplastic web 1 into the bag making station 3 the predetermined length of a bag, and the sealing and severing operation is repeated.

During normal continuous operation of bag making machine cycles, the servo motor 14 of the intermittent feeder 2 is driven to feed the thermoplastic web 1 a specified distance in a forward direction by the sequencer 19. The thermoplastic web 1 is fed into the bag making device 3 by rotating the drive roll 11 and the nip roll 12 in a clockwise and counterclockwise direction, respectively, as depicted by the directional arrow "a", as shown in FIG. 1. After feeding the thermoplastic web 1 the length of a bag 4, as programmed by the digital dimension setting apparatus 18 via a feedback pulse from the encoder 13, the servo motor 14 stops. In this state, the servo motor 24 of the bag making station 3 is driven one cycle to allow the upper seal bar 23 to lower and advance toward the lower seal bar 21 and then rise and arrest movement. During this time, the thermoplastic web 1 is severed and simultaneously, the leading and trailing edges of the severed portion of the thermoplastic web 1 are hot sealed to form a bag 4.

When it is necessary to interrupt the bag making procedure, the severing and sealing operation in process is completed. The sequencer 19 then quickly drives the servo motor 14 of the intermittent feeder 2 to retract the thermoplastic web 1 in a backward direction. Here, the drive roller 11 and nip roller 12 rotate in the arrow "b"

direction to rapidly retract and isolate the thermoplastic web 1 from the bag making station 3, thereby insuring the structural integrity of the thermoplastic web 1. After the thermoplastic web 1 is quickly retracted by a length set by the digital switch 16 of the digital pack 17 via a feedback pulse from the encoder 13, the servo motor 14 stops.

Figure 2C:
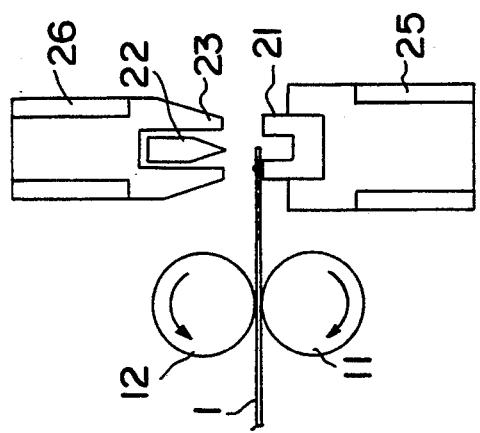
Figure 2B:
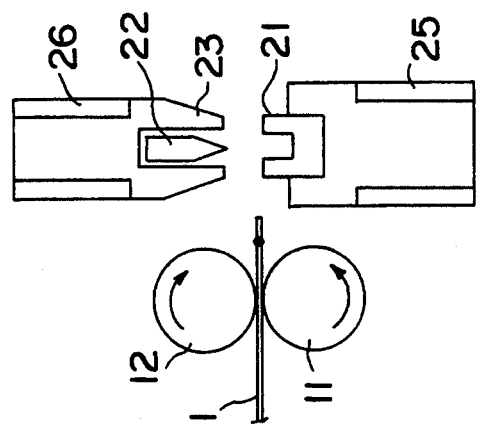
Figure 2A:
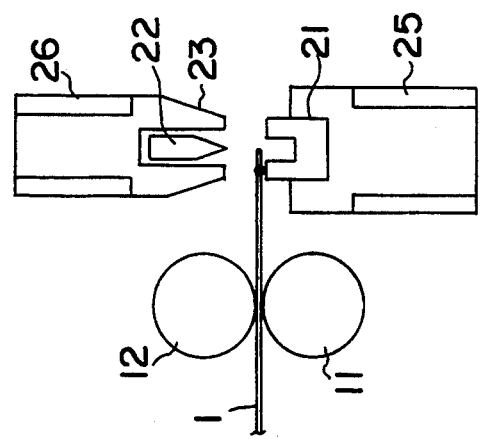

FIG. 2(A) illustrates the position of the thermoplastic web 1 at the completion of a bag making machine cycle. The thermoplastic web 1 is between the upper seal bar 23 and the lower seal bar 21 of the hot bag making station 3. When a thermoplastic web 1 stops in this position, such as during interruption of the bag making procedure, the lower seal bar 21, heated by a first heater 25, and the upper seal bar 23, heater by a second heated 26, as well as radiant heat from the cutting edge 22, tend to undesirably melt the thermoplastic web 1.

In order to avoid the undesirable effect of heat on the thermoplastic web 1 from lower seal bar 21, upper seal bar 23, and heated cutting edge 22, the thermoplastic web 1 is isolated by rapidly retracting it, as shown in FIG. 2(B). The drive roller 11 and nip roller 12 have reversed direction and isolated the thermoplastic web 1 from the bag making station 3.

FIG. 2(C) illustrates the direction of rotation of the drive roller 11 and nip roller 12 in the forward direction after resumption of a new bag making machine cycle. The moment a start signal is given to resume the operation of the bag making machine, the sequencer 19 drives the servo motor 14 of the intermittent feeder 2 to return the thermoplastic web 1 to its pre-interrupt position. Thus, as seen in FIG. 1, the drive roller 11 and nip roller 12 rotate in the arrow "c" direction to return the thermoplastic web 1 into the bag making station 3. When the thermoplastic web 1 is fed by a length set by the digital switch 16 of the digital pack 17 via a feedback pulse from the encoder 13, the servo motor 14 stops, returning to the state shown in FIG. 2 (A).

Since the retraction of the thermoplastic web 1 during cessation of the bag making procedure and the return of the thermoplastic web 1 to its original position during resumption of the bag making procedure are performed by utilizing the numerical command function of the digital pack 17, a bag length can be facilely set and altered by a machine operator. When, for example, the digital switch 16 of the digital pack 17 is set to 250, retraction of a thermoplastic web 1 during cessation of a bag making machine cycle, and the corresponding return of a thermoplastic web 1 to its original position, will be 25 mm.

Figure 3:
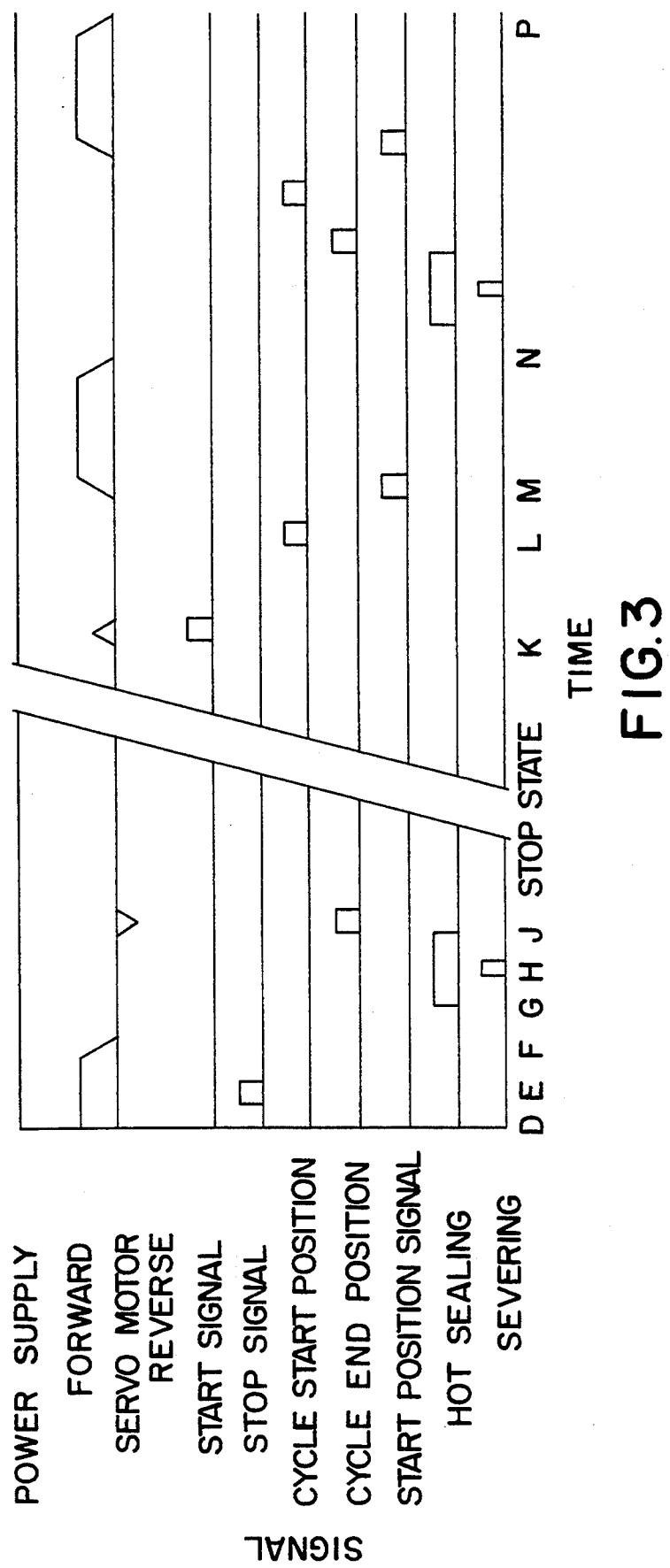

FIG. 3 illustrates the timed relation of the bag making machine cycle signals as controlled by the sequencer 19. The abscissa is time, and the ordinate shows various command signals controlled by the sequencer 19. FIG. 3 shows the duration of a particular electrical signal as issued by the sequencer 19.

Shown at time D is a signal which commands forward rotation of the drive 11 and nip 12 rollers driven by the servo motor 14. At time E, a stop signal is issued, and the servo motor continues to rotate the drive 11 and nip 12 rollers in the forward direction until complete advancement of the thermoplastic web 1 is achieved, shown at time F. At time G, the hot sealing operation of the upper seal bar 23 commences, and while hot sealing of a thermoplastic web 1 is occurring, the severing operation of the cutting edge 22 takes place, shown at time H. The hot sealing operation continues until time J, at which time a cycle end position signal is issued by the sequencer 19. Simultaneously at time J, the servo motor 14 quickly reverses the direction of the drive 11 and nip 12 rollers to retract a thermoplastic web 1 from the bagging device 3. The substantially vertical interruption of time in FIG. 3 indicates the indefinite period of cessation of operation of a bag making machine operation.

Upon issuance of a start signal at time K, the servo motor simultaneously rotates the drive 11 and nip 12 rollers in the forward direction. The thermoplastic web 1 is rotated the same distance in the forward direction as it was retracted following the cessation of a current bag making cycle. When a thermoplastic web 1 reaches its initial position again, a cycle start position signal is issued at time L. The cycle start position signal indicates that normal resumption of a bag making machine cycle may occur, and the start position signal at time M simultaneously signals operation of the servo motor to rotate the drive 11 and nip 12 motors in the forward direction. Continuation of the normal bag making procedures is shown from time N to time P.

SUMMARY OF MAJOR ADVANTAGES OF THE INVENTION

After reading and understanding the foregoing inventive bag making machine and control thereof, in conjunction with the drawings, it will be appreciated that several distinct advantages of the subject invention are obtained.

Without attempting to set forth all of the desirable features of the instant bag making machine and control, at least some of the major advantages of the invention include the unique control mechanism which obviates the mechanical restraints of previous drive methods of bag making machines. More specifically, use of a servo motor 14 regulated by the control method described herein eliminates unsatisfactory use of pulleys and brake and clutch mechanisms, which do not insure precise timing of operation.

Use of a servo motor 14 and control method allow fast retraction of a thermoplastic web 1 from the bag making station 3 during interruption of a bag making procedure. Rapid retraction of the thermoplastic web 1 insures maintenance of the integrity of the thermoplastic web 1 by isolating the thermoplastic web 1 from the adverse effects of heat emanating from the lower 21 and upper 23 seals bars of the bagging device 3 as well as radiant heat from the cutting edge 22.

The subject control provides for essentially instantaneous advancement and retraction of the thermoplastic web 1 upon issuance of start and stop signals, respectively. The disclosed configuration allows for minimal timing errors of various components of the bag making machine, thereby increasing machine efficiency and reliability.

In describing the invention, reference has been made to a preferred embodiment and illustrative advantages of the invention. Those skilled in the art, however, and familiar with the instant disclosure of the subject invention, may recognize additions, deletions, modifications, substitutions and other changes which will fall within the purview of the subject invention and claims.

What is claimed is:

1. A bag making machine for producing thermoplastic resin film bags comprising:
    roller means for intermittently advancing, in a first direction, a flat tubular web of thermoplastic resin film to be formed into a thermoplastic bag;

sealing means positioned downstream from said roller means for applying heat to and thereby providing a transverse seal across the flat web of the thermoplastic resin film, said sealing means comprising, a lower stationary sealing bar having a generally U-shaped configuration in cross-section, and an upper reciprocating sealing bar having mutually parallel downward extending arms, said upper reciprocating sealing bar dimensioned to cooperate with said lower stationary sealing bar to seal the flat web of thermoplastic resin film;

a heated cutting bar having a sharp edge positioned between said downward extending arms of said upper reciprocating sealing bar which transversely severs the thermoplastic resin film, said heated cutting bar being heated to a higher degree than said sealing means for providing efficient cutting and concomitantly preventing build-up of any carbon by-product from cutting the flat web of thermoplastic resin film;

said roller means being operable for reversing the direction of advancement of the flat web of thermoplastic resin film in a second direction and retracting the flat web of thermoplastic resin film material to rapidly withdraw the material from juxtaposition to said heated cutting bar upon interruption of the bag making procedure;

first drive means for controllably driving said roller means in said first and second directions;

second drive means for transversely driving said sealing means and said heated cutting bar toward and away from the flat web of the thermoplastic resin film;

encoder means for sensing the position of said first drive means and producing a count signal in response thereto;

processing means responsive to said encoder means for controlling the operation of said first and second drive means and controlling said intermittent advancement and retraction of said flat web of thermoplastic resin film;

said processing means producing first, second, and third operating mode signals wherein said third operating mode signal is a stop signal; and said first drive means operating in said first direction in response to said first operating mode signal and further operating in a second direction opposite to said first direction in response to said second operating mode signal, wherein upon production of said third operating mode signal by said processing means at any time during the bag making procedure, a current bag making cycle is completed and then said second operating mode signal is produced by said processing means whereby the flat web of thermoplastic resin film is rapidly drawn away from said heated cutting bar to isolate a free end of said flat web of thermoplastic resin film from damaging heat transfer from said heated cutting bar.

2. A bag making machine for producing thermoplastic resin film bags as defined in claim 1 wherein said first drive means comprises:

a first servo motor operable to drive said roller means in said first and second directions.

3. A bag making machine for producing thermoplastic resin film bags as defined in claim 1 wherein said second drive means comprises:

a second servo motor operable to drive said sealing and heated cutting bar.

4. A bag making machine for producing thermoplastic resin film bags as defined in claim 1 wherein said processing means comprises:

a sequencer for producing timing and control signals.

5. A sequencer as defined in claim 4 wherein said timing and control signals further comprise:

a start signal, a cycle start position signal, and a cycle end position signal, which correlate the operations of said bag making machine.

6. A bag making machine for producing thermoplastic resin film bags as defined in claim 1 wherein said processing means comprises:

a servo motor driver.

7. A bag making machine for producing thermoplastic resin film bags as defined in claim 1 wherein said processing means comprises:

digital storage means for operably permitting variation of a retraction length of said flat web of thermoplastic resin film in response to a feedback pulse from said encoder.

8. A bag making machine for producing thermoplastic resin film bags as defined in claim 1 wherein said processing means comprises:

digital dimension setting means for operably permitting variable user control of a desired length of a bag made from said flat web of thermoplastic resin film.

9. A bag making machine for producing thermoplastic resin film bags as defined in claim 1 wherein said processing means comprises:

a sequencer for producing timing and control signals;

a servo motor driver;

digital storage means for operably permitting variation of a retraction length of said flat web of thermoplastic resin film in response to a feedback pulse from said encoder; and digital dimension setting means for operably permitting variable user control of a desired length of a bag made from said flat web of thermoplastic resin film.

* * * * *